United States Patent [19]

Hobo et al.

[11] 3,955,097

[45] May 4, 1976

[54] ALTERNATOR DRIVEN BY A VEHICLE ENGINE

[75] Inventors: Nobuhito Hobo, Inuyama; Osamu Ito, Toyota; Yoshihiko Tsuzuki, Anjo; Yutaka Suzuki, Nishio; Itsushi Kawamoto, Kariya; Suguru Sato; Yoshihiko Huruya, both of Oobu; Kenro Sekino; Hironari Nukata, both of Toyota, all of Japan

[73] Assignees: Nippondenso Co., Ltd., Kariya; Toyota Jidosha Kogyo Kabushiki Kaisha, Toyota, both of Japan

[22] Filed: Oct. 25, 1974

[21] Appl. No.: 518,214

[30] Foreign Application Priority Data

Nov. 29, 1973 Japan................................ 48-134053

[52] U.S. Cl................................................. 290/40 R
[51] Int. Cl.².......................................... F02N 11/06
[58] Field of Search ................... 290/40, 32, 14, 38, 290/17, 39; 318/147, 144, 148, 151, 157, 158; 321/61

[56] References Cited

UNITED STATES PATENTS

| | | | |
|---|---|---|---|
| 3,543,037 | 11/1970 | Baldwin | 290/40 X |
| 3,551,685 | 12/1970 | Corry | 290/40 |

*Primary Examiner*—Herman T. Hohauser
*Attorney, Agent, or Firm*—Cushman, Darby & Cushman

[57] ABSTRACT

There is provided a vehicle engine-driven alternator wherein an internal combustion engine is coarsely adjusted to a preset speed by an engine governor, the turning driving force of the engine is transmitted to an alternator through a magnetic slip coupling, and the excitation current to the magnetic slip coupling is controlled by an excitation control circuit which compares the number of revolutions of the alternator with a preset value to generate an output depending on the result of the comparison, thereby providing a source of alternating current having an extremely accurate preset frequency.

13 Claims, 9 Drawing Figures

3,955,097

ALTERNATOR DRIVEN BY A VEHICLE ENGINE

BACKGROUND OF THE INVENTION

1. Field of the Invention

The present invention relates generally to alternators, and more particularly to an alternator of the type which is used in a vehicle employing a gasoline engine or diesel engine as the main vehicle engine and which is driven by this main vehicle engine to provide a source of alternating current having a high degree of frequency accuracy.

2. Description of the Prior Art

In known alternators of the above type which are driven by internal combustion engines (hereinafter simply referred to as engines), a so-called mechanical coupling method is employed in which the output shaft of the engine and the rotor driving shaft of the alternator are rotated in direct drive or at any other gear ratio or through a velt pulley, and the engine is provided with an engine governor such as a mechanical governor and the accelerator operating lever linked to the throttle valve of the engine, the fuel control rack of the fuel injection pump or the like to regulate the number of revolutions of the engine.

A disadvantage of this conventional arrangement in which the engine is mechanically coupled to the alternator and the number of revolutions of the alternator is regulated by the engine governor is that no matter how the efficiency of the engine governor were improved, it would be extremely difficult to reduce the fluctuation of revolutions below 0.5 % due to causes such as a time delay between the feeding of fuel to the engine and the conversion of the fuel to rotating energy, and variation in the rotating torque generated in each combustion cycle.

However, due to the growth in recent years of the number of electronic devices of the type which are locked to the power supply frequency, such as, a video tape recorder in which the variation in the alternating current power supply frequency must be limited to less than 0.33 % of the preset value (e.g., less than 0.2 Hz for the 60 Hz power source), it is not infrequent that the frequency accuracy of the conventional power supply units is found to be insufficient as compared with that required for the installation of such electronic devices in a vehicle.

While another method has been proposed in which the output of an engine driven-alternator is converted into a direct current to charge the battery, and the direct current is also converted back into alternating current by a stationary inverter, it also has the disadvantages such as the problem of waveform distortion, deterioration in the efficiency of the system on the whole, and increased manufacturing costs.

SUMMARY OF THE INVENTION

With a view to overcoming the foregoing difficulty, it is an object of the present invention to provide a vehicle engine-driven alternator wherein an engine is coarsely adjusted to a present speed by an engine governor, the turning driving force of the engine is transmitted to an alternator through a magnetic slip coupling, and the excitation current to the magnetic slip coupling is controlled by an excitation control circuit which compares the number of revolutions of the alternator with a preset value to produce an output depending on the result of the comparison, whereby reducing the loss of the magnetic slip coupling, and regulating the amount of torque transmitted from the magnetic slip coupling in accordance with the deviation of the number of revolutions of the alternator from the preset value, and thereby providing a source of alternating current having an extremely accurate preset frequency.

The vehicle engine-driven alternator according to the present invention has among its great advantages the fact that not only it is capable of reducing the loss of the magnetic slip coupling and ensuring a high degree of frequency accuracy and highly improved efficiency, but also the excitation current to the magnetic slip coupling can be controlled by a digital, rotating period measuring type control system.

DESCRIPTION OF THE PREFERRED EMBODIMENT

The present invention will now be described in greater detail with reference to the accompanying drawings.

Figure 1:
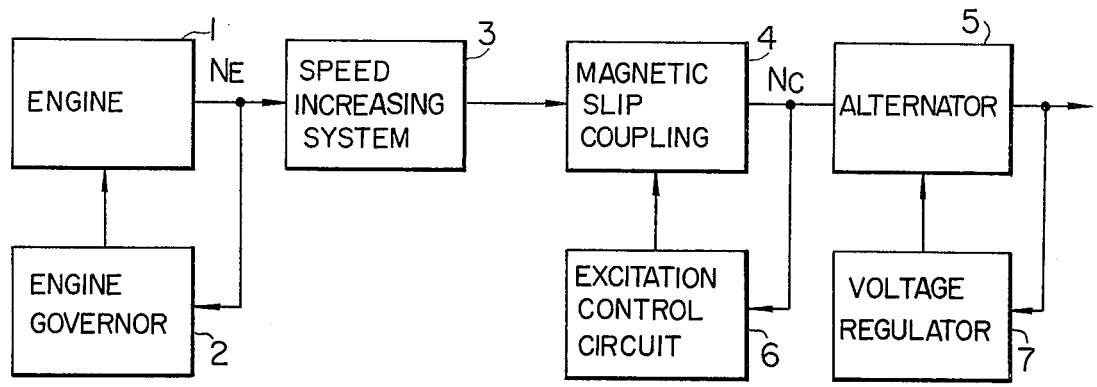
FIG. 1 is a block diagram showing the construction of an embodiment of a vehicle engine-driven alternator according to the present invention.
Figure 2:
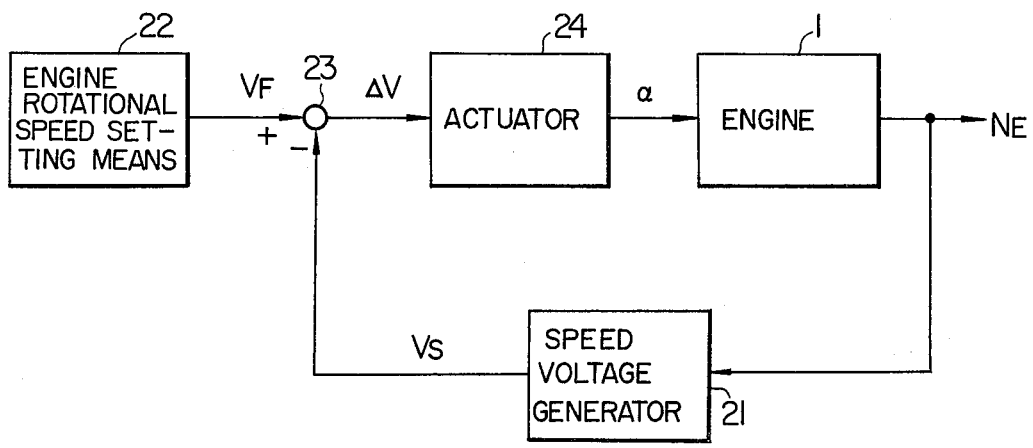
FIG. 2 is a block diagram showing the construction of the engine governor used with the apparatus of this invention.

Referring now to FIG. 1 showing the construction of an embodiment of this invention, numeral 1 designates a main vehicle engine, 2 an engine governor, 3 a speed increasing system including a driving transmission, a power take off unit (hereinafter referred to as a PTO unit), etc., 4 a magnetic slip coupling, 5 an alternator, 6 an excitation control circuit, 7 a generator voltage regulator. The engine 1 constitutes a power source for generating a turning driving force and it may be either a gasoline engine or a Diesel engine which constitutes a main vehicle engine and which is also used for driving the alternator. The engine governor 2 is provided for coarsely adjusting the rotational speed of the engine 1 to a preset speed, and it may for example be an electric constant speed governor as shown by the block diagram of FIG. 2. More specifically, a speed voltage generator 21 comprising for example a tachogenerator which is operatively associated with the output shaft of the engine 1, generates a speed voltage $V_S$ proportional to the engine speed $N_E$, and a comparator 23 compares the speed voltage $V_S$ with a preset engine voltage $V_F$ of an engine rotational speed setting means 22 which was preset in accordance with the preset engine rotational speed $N_F$ so as to detect an error voltage $\Delta V(=V_F-V_S)$ between the speed voltage $V_S$ and the preset voltage $V_F$. Then the error voltage $\Delta V$ is applied, after amplification, to an electromechanical conversion actuator 24 to adjust the amount of movement $\alpha$ of the accelerator operating lever of the engine 1, and in this way the automatic control of the engine rotational speed is accomplished utilizing the preset engine rotational speed as a desired value.

Figure 3:
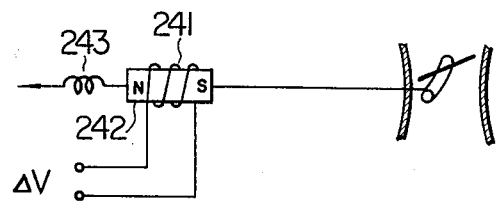
FIG. 3 is a schematic view showing an exemplary form of the actuator of the engine governor shown in FIG. 2.

In FIG. 3, there is illustrated an exemplary form of the electro-mechanical conversion actuator 24, and the engine accelerator depression $\alpha$ is determined in accordance with the state of equilibrium between the electromagnetic force applied to a permanent magnet type moving core 242 from an electromagnetic coil 241 and the force of a return spring 243. The coarse adjustment of the engine rotational speed is accomplished by this engine governor with the accuracy of about ±5 %.

The speed increasing system 8 is designed so that the turning driving force from the engine 1 is taken off by the PTO unit mounted on the driving power transmission and it is multiplied by the gear having a suitable gear ratio. In other words, since the maximum output of the main vehicle engine 1 is for the most part considerably greater than the generator driving output, the number of revolutions of the engine is increased to reduce the preset speed of the engine rotational speed to a several part of the number of revolutions of the generator at its preset value to obtain the operating conditions which provide high engine efficiency and reduce the engine noises. On the other hand, the PTO unit is usually connected to the counter third gear of the vehicle driving transmission to take off the turning driving force from the engine and utilize it for purposes other than the driving of the vehicle.

Figure 4:
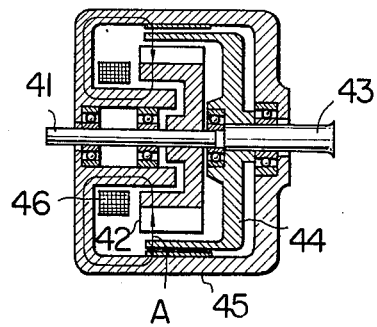
FIG. 4 is a sectional view showing an exemplary form of the magnetic slip coupling used with the apparatus of the present invention.
Figure 5:
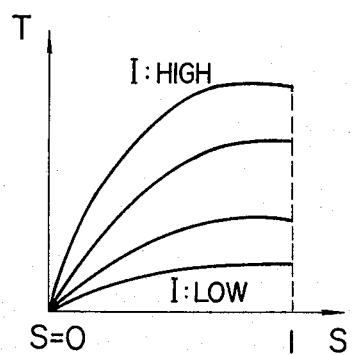
FIG. 5 is a torque transmitting characteristic diagram of the magnetic slip coupling shown in FIG. 4.

The magnetic slip coupling 4 is one whose excitation current is varied to adjust the torque transmitted from the input shaft to the output shaft, and hence the slip between the input and output shafts is adjustable in accordance with the excitation current. In the exemplary form shown in the sectional view of FIG. 4, the magnetic slip coupling 4 is shown consisting of an eddy-current coupling based on the electromagnetic induction, in which an inductor 42 directly mounted on an input shaft 41 and a rotating drum 44 directly mounted on an output shaft 43 are rotatably arranged opposite to each other with a small air gap therebetween. When an excitation current is supplied to an exciting coil 46, a closed magnetic path shown by a loop A comprising a frame 45 is formed so that the rotation of the input shaft 41 generates a revolving magnetic field in the rotating drum 44 to cause a flow of eddy current by the electromagnetic induction and a torque is transmitted from the input shaft 41 to the output shaft 43. The magnitude of the torque T transmitted to the output shaft 43 varies in accordance with the excitation current I and the slip S between the input shaft 41 and the output shaft 43 as shown by the characteristic diagram of FIG. 5. Consequently, by controlling the excitation current, it is possible to vary the torque transmitted from the input shaft 41 to the output shaft 43 and thereby to adjust the slip between the two shafts. The input shaft 41 of the magnetic slip coupling 4 is connected to the output shaft of the engine 1 through the speed increasing system 3, and the output shaft 43 is connected to the rotor shaft of the alternator 5, so that the number of revolutions of the alternator 5 may be adjusted by controlling the excitation current.

The excitation control circuit 6 is designed so that the number of revolutions of the alternator 5 is detected to compare it with a preset value corresponding to a preset number of revolutions, and the excitation current supplied to the magnetic slip coupling 4 is controlled in accordance with the output of the excitation control circuit 6 to correct the error in the revolutions of the alternator 5 with the preset revolutions as the desired value. In this embodiment, the alternator 5 comprises a synchronous machine so that the frequency of the AC power supply voltage is determined by the number of revolutions of the generator rotor, and therefore the variation of the frequency corresponds to the variation of the generator rotor revolutions.

Figure 6:
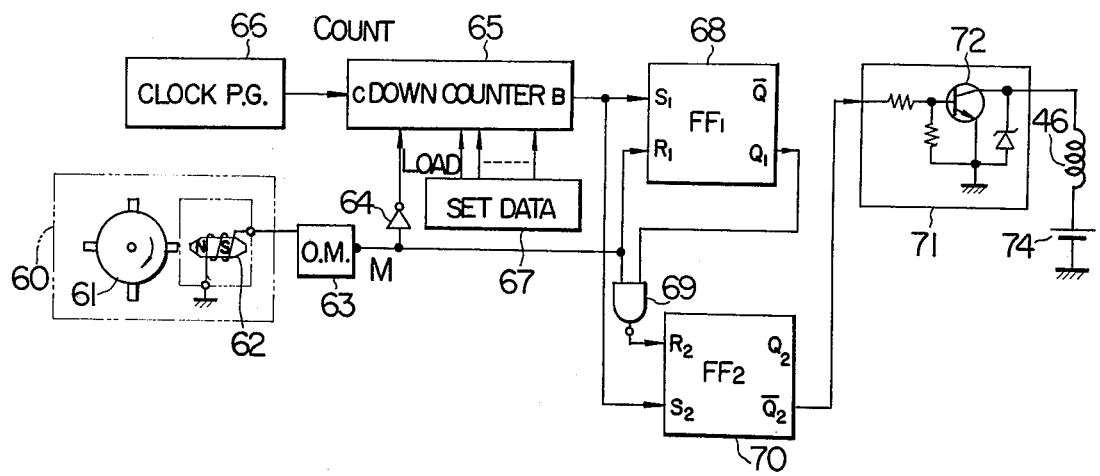
FIG. 6 is a schematic diagram showing an exemplary form of the excitation control circuit used with the apparatus of the invention.
Figure 7:
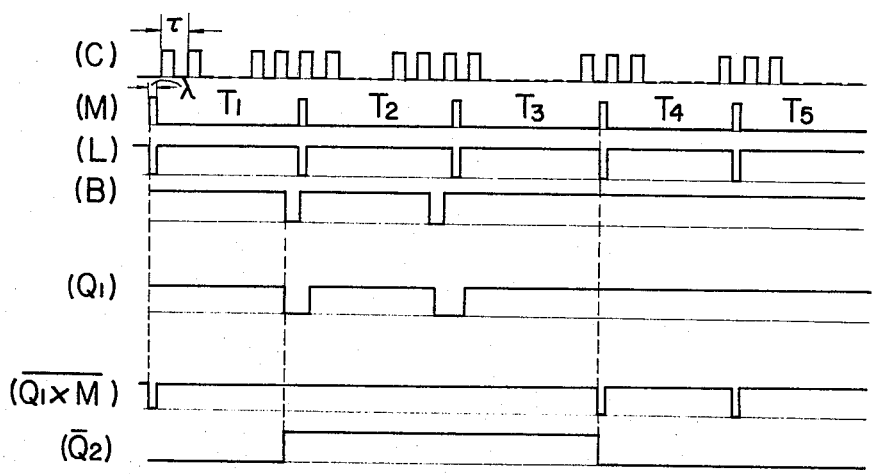
FIG. 7 is a time chart useful in explaining the operation of the circuitry shown in FIG. 6.

One form of the excitation control circuit 6 is a digital, rotating period measuring type whose circuit construction is shown in FIG. 6, and it will be described with reference to the time chart shown in FIG. 7.

The arrangement of FIG. 6 is designed so that the time period required for the rotor of the alternator 5 to rotate through a given rotational angle is compared with a preset value of a predetermined reference time period to effect the required error detection. Thus, each time the alternator rotor rotates through a given rotational angle corresponding for example to one fourth of its revolution, a revolution detecting pulse is generated, and pulse modulation is effected with clock pulses for the duration of the repetition time interval of the revolution detecting pulses, so that the number of the modulated pulses is counted at every period of the revolution detecting pulse to measure the rotating period of the alternator rotor, and it is then compared with a preset value corresponding to the rotating period of the alternator 5 rotating at its preset revolutions, thus producing an output depending on the result of the comparison and effecting the on-off control of the excitation current supplied to the magnetic slip coupling 4 in accordance with the said output.

In FIG. 6, numeral 60 designates a revolution detector designed so that an electromagnetic pickup 62 mounted opposite to an inductor 61 directly connected to the rotor of the alternator 5, generates a revolution detecting pulse for every one-fourth revolution of the inductor 61. The repetition time interval of the revolution detecting pulses is given as $T = 60/4\ N_G$ (sec), where $N_G$ is the rotational speed (r.p.m.) of the alternator rotor. This revolution detecting pulse is used to trigger a one-shot multivibrator 63 to generate the measuring pulse signal M shown in FIG. 7(M) and having the same repetition period as the revolution detecting pulse. The measuring pulse signal M is inverted through an inverter 64 to generate the time measuring signal L shown in FIG. 7(L) and the signal L is then applied to the load terminal of a down counter 65 (e.g., SN74193, Texas Instrument, U.S.A.) constituting a comparison circuit. On the other hand, a clock pulse generator 66 generates, by means of a crystal oscillator, high precision reference time clock pulses C shown in FIG. 7(C) and having a time interval $\tau$, and the clock pulses are applied to the down count terminal of the down counter 65. Assuming that $T_0$ represents the repetition time interval of the revolution detecting pulse when the speed of the alternator is equal to the preset number of revolutions, the data set terminals of the down counter 65 are set to a number $N_0$ of reference pulses in $T_0 = N_0 \cdot \tau$. This data setting is accomplished by a set data 67.

In this way, each time the measuring pulse (the time width λ) is applied to the down counter 65, it is data set to the number $N_0$ of pulses, and the clock pulses are counted down for the duration of the repetition period of the measuring pulse signal M. In this case, if $N$ is the number of the clock pulses counted when the number of revolutions of the alternator is equal to $N_G$, when the alternator speed is lower than a preset number $N_{G0}$ of revolutions so that $T > T_0$, the number $N$ of the clock pulses applied to the down counter 65 becomes greater than the preset value $N_0$ and hence $N \geq N_0$ causing the down counter 65 to generate a borrow pulse at its borrow terminal. This borrow pulse is shown in the measuring periods $T_1 > T_0$ and $T_2 > T_0$ of FIG. 7(B). On the other hand, if $N_G > N_{G0}$ so that $T < T_0$ and hence $N < N_0$, the down counter 65 generates no borrow pulse. This is seen in the measuring cycles $T_3 < T_0$, $T_4 < T_0$ and $T_5 < T_0$ of FIG. 7(B). The borrow pulse signal generated at the borrow terminal of the down counter 65 and the measuring pulse signal M are respectively applied to terminals $S_1$ and $R_1$ of an R-S flip-flop 68, and the signal $Q_1$ shown in FIG. 7($Q_1$) is generated at its terminal $Q_1$. The signal $Q_1$ and the measuring pulse signal M are applied to a NAND circuit 69 producing the signal $\overline{Q_1 \times M}$ shown in FIG. 7 ($\overline{Q_1 \times M}$), and the signal $\overline{Q_1 \times M}$ and the borrow pulse signal B are respectively applied to terminals $R_2$ and $S_2$ of an R-S flip-flop 70, thus producing at its terminal $\overline{Q_2}$ the error signal which is shown in FIG. 7($\overline{Q_2}$) and which goes to a high level at the movement that the borrow pulse was produced and remains at the high level for the duration of the next one measuring pulse time interval.

Consequently, if $N_G$ is the number of revolutions of the alternator and $N_{G0}$ is the preset number of revolutions of the alternator, then $N_G < N_{G0}$, the down counter 65 generates a borrow pulse and thus the error signal $Q_2$ goes to the high level. When this occurs, a transistor 72 of an amplifier 71 is turned on to cause a flow of excitation current from a battery 74 to the exciting coil 46 of the magnetic slip coupling 4, and the amount of torque transmitted from the magnetic slip coupling 4 is increased to control the alternator in a direction that increases its number of revolutions. On the other hand, when $N_G > N_{G0}$, the down counter 65 produces no borrow pulse and thus the error signal $\overline{Q_2}$ goes to the low level, with the result that the transistor 72 of the amplifier 71 is turned off and the supply of excitation current to the exciting coil 46 of the magnetic slip coupling 4 is interrupted to terminate the transmission of the torque.

While the amount of torque transmitted from the magnetic slip coupling 4 varies within a small range of values centering around the value of the rotating torque required for driving the alternator 5 at its preset speed in the manner described above, the inertia of the alternator rotor may be suitably selected with respect to the frequency of the torque variation so that apparently there occurs no speed variation.

The excitation control circuit 6 shown by way of example in FIG. 6 thus consists of a rotating period measuring type digital rotational speed error detecting circuit in which the time required for the alternator rotor to rotate through a given rotational angle, i.e., the rotating period of the rotor is compared with a predetermined reference time to effect the detection of errors. With this method, the accuracy of error detection is dependent on the number of clock pulses counted during the repetition time $T_M$ of the period detecting pulse. (In this case, the error in the repetition period of the clock pulses is assumed to be negligible, since they are generated by a crystal controlled oscillator or the like.) In other words, since the counting error of the down counter 65 is ±1 pulse, there exists between the required accuracy δ of error detection and the repetition period $t_0$ of the clock pulses a relationship $\delta = \pm t_0/T_M$. If, in the previously described example, the preset alternator speed $N_{G0}$ is 3,600 r.p.m. and the required error detection accuracy is 0.1 %, then we obtain $$t_0 = \delta T_M = 10^{-3} \times \frac{60}{4 \times 3,600} = \frac{10^{-3}}{240} (\text{sec})$$

and hence the repetition frequency of the clock pulses is given as $f_0 = 1/t_0 = 240$ (kHz).

It is of course necessary to adjust the engine governor so that the number of revolutions of the input shaft of the magnetic slip coupling 4 is always higher by an amount equivalent to the slip of the magnetic slip coupling 4 even at the maximum load of the alternator.

Figure 8:
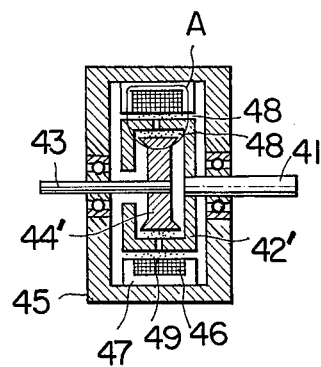
FIG. 8 is a sectional view showing another form of the magnetic slip coupling used with the apparatus of the invention.
Figure 9:
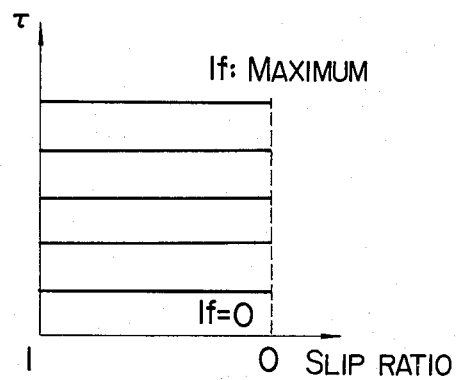
FIG. 9 is a torque transmitting characteristic diagram of the magnetic slip coupling shown in FIG. 8.

The excitation control circuit 6 which accomplishes the above-described controls is not limited to the illustrated one. For example, it may take another form so that the number of the revolution detecting pulses entered during the gating time of a counter which is determined by the reference pulses from a reference timing generator is counted by the counter, and a count comparison which compares the number of the counted pulses with a preset value determined by the preset revolutions of the alternator is repeated at each period of the reference pulses to effect the detection of errors. Still another form of the excitation control circuit 6 is possible in which the revolution detecting pulse is converted into an analog speed voltage through a frequency-to-voltage conversion, and the analog speed voltage is compared with a reference voltage (DC voltage) corresponding to the preset revolutions of the alternator to effect the detection of errors. It is also self-evident that the revolution detector 60 may be used so that the AC output voltage per se of the alternator 6 is divided to produce revolution detecting pulses. Further, while the magnetic slip coupling 4 has been described and illustrated in FIG. 4 as an eddy-current type magnetic slip coupling having an air gap, it may be a magnetic powder clutch having magnetic powder placed in the air gap as shown in FIG. 8. In other words, in FIG. 8, numeral 41 designates an input shaft, 42' an input rotor (magnetic material), 43 an output shaft, 44' an output rotor (magnetic material), 45 a housing, 46 an exciting coil, 47 a yoke (magnetic material), 48 a magnetic powder, 49 a magnetic flux shield ring. When an excitation current flows in the exciting coil 46, the closed magnetic path shown by the loop A is formed from the yoke 47 through the input rotor 42' and the output rotor 44' to magnetize them, and the air gap is filled with the chain-like magnetic powder 48, thus producing a frictional force corresponding to the excitation current from the input rotor 42' to the output rotor 44' and transmitting the rotating torque. Then, upon interrupting the excitation current, the magnetic powder 48 is demagnetized and broken into particles so that the input and output 42' and 44' are again separated by the air gap, and the torque is no longer transmitted. Fir. 9 shows the torque transmission characteristic of this clutch. Consequently, by connecting the input shaft 41 to the engine 1 side and the output shaft 43 to the alternator 6 side, the excitation current to the exciting coil 46 may be controlled by the excitation control circuit 6 to control the amount of torque to be transmitted and thereby to control the number of revolutions of the alternator 5. The voltage regulator 7 may be realized with a circuit construction in which the AC output voltage of the alternator 5 is detected and then converted to a DC voltage through a rectifier circuit, a filter circuit, etc., and the DC voltage is compared with a preset voltage to perform the operation of error detection, thus controlling the excitation current to the alternator 5 and thereby to control the output voltage of the alternator 5. Since there are many prior art circuit constructions of this type, the voltage regulator 7 will not be described further.

Further, while, in the embodiment of the invention described hereinabove, the present invention has been applied to the vehicle engine-driven alternator wherein the engine 1, constituting a source of driving power which generates the necessary turning driving force for the vehicle, is also used for driving the alternator 5, a separate engine may be used in addition to the main vehicle engine 1 to drive the alternator 5, or alternately, where there is an auxiliary engine for driving the air conditioner compressor, the alternator 5 may be driven by this auxiliary engine. Furthermore, in applications other than vehicles such as in a ship, its driving engine may be employed to drive an alternator. Still furthermore, the present invention may be applied to a generation set adapted for use in a power station on an isolated island or an independent power plant.

Moreover, while, in the illustrated and described embodiment of the invention, the rotation of the engine 1 is transmitted through the magnetic slip coupling 4 to the alternator 5 to operate it at a constant speed, the alternator 5 may be operated at a constant speed by transmitting the rotation of the engine 1 through rotation transmitting means such as a stepless speed change gear which makes use of frictional force.

What is claimed is:

1. A vehicle engine-driven alternator of the type which generates an AC power supply voltage having a constant frequency, comprising:
    an engine for generating a turning driving force;
    an engine governor for coarsely adjusting the rotational speed of said engine to a preset speed;
    a magnetic slip coupling having an input shaft connected to said engine and an output shaft, whereby the turning driving force applied from said engine to said input shaft is transmitted to said output shaft in the form of a torque corresponding to an excitation current supplied to said magnetic slip coupling;
    an alternator connected to said output shaft of said magnetic slip coupling for generating an AC power supply voltage having a frequency corresponding to the number of revolutions of said output shaft; and
    an excitation control circuit for detecting and comparing the number of revolutions of said output shaft with a preset value to generate an output depending on the result of said comparison, whereby said excitation current is controlled in accordance with said output to cause the number of revolutions of said output shaft to approach said preset value.

2. An apparatus according to claim 1, wherein said excitation control circuit includes:
    a revolution detector for generating an output pulse having a frequency proportional to the number of revolutions of said output shaft;
    a clock pulse generator for generating a clock pulse having a predetermined frequency;
    a comparison circuit connected to said clock pulse generator and said revolution detector for comparing a preset value of a predetermined time determined by said clock pulses with a rotation time dependent on said detector output pulse at predetermined intervals; and
    an excitation current control circuit connected to said comparison circuit, whereby said excitation current is controlled in accordance with the output of said comparison circuit to cause said rotation time dependent on said detector output pulse to approach said preset value of said predetermined time determined by said clock pulses.

3. An apparatus according to claim 1, wherein said excitation control circuit includes:
    a clock pulse generator for generating a clock pulse having a predetermined frequency;
    a revolution detector for generating an output pulse having a frequency proportional to the rotational speed of said output shaft;
    a comparison circuit connected to said revolution detector and said clock pulse generator for counting said clock pulses at the period of said detector output pulse and comparing said count with a preset value; and
    an excitation current control circuit connected to said comparison circuit for controlling said excitation current in accordance with the output of said comparison circuit and causing said count to approach said preset value.

4. An apparatus according to claim 1, wherein said engine governor includes:
    an engine revolution detector for detecting the number of revolutions of said engine and generating an engine revolution voltage;
    engine revolution setting means for generating a set engine revolution signal corresponding to a preset number of revolutions of said engine;
    a comparison circuit connected to said engine revolution setting means and said engine revolution detector for comparing said engine revolution voltage with said set engine revolution signal; and
    an actuator for controlling said engine in accordance with the output of said comparison circuit to cause the number of revolutions of said engine to approach said preset number of revolutions.

5. An apparatus according to claim 1, wherein said engine governor includes:
    a speed voltage generator for detecting the number of revolutions of said engine and generating a speed voltage proportional to the rotational speed of said engine;
    engine rotational speed setting means for generating a set engine speed voltage corresponding to a preset rotational speed of said engine;
    a comparison circuit connected to said engine rotational speed setting means and said speed voltage generator for comparing said speed voltage with said set engine speed voltage; and
    an actuator for controlling said engine in accordance with the output of said comparison circuit and causing the rotational speed of said engine to approach said preset rotational speed.

6. An apparatus according to claim 1 further comprising a voltage regulator for regulating the output voltage of said alternator.

7. An apparatus according to claim 1, said engine consists of a main vehicle engine constituting a source of running power for generating a turning driving force for vehicle.

8. An apparatus according to claim 7 further comprising speed increasing means connected between said engine and said alternator to increase the rotation of said engine for transmission to said alternator.

9. An apparatus according to claim 2, wherein said excitation current control circuit includes a switching circuit for switching said excitation current on and off in accordance with the outputs of said comparison circuit generated at said predetermined intervals.

10. A vehicle engine-driven alternator of the type which generates an AC power supply voltage having a constant frequency, comprising:
   an engine for generating a turning driving force;
   an engine governor for coarsely adjusting the rotational speed of said engine to a preset speed;
   an alternator for generating an AC power supply voltage having a frequency corresponding to the number of revolutions thereof; and
   rotation transmitting means having an output shaft connected to said alternator and an input shaft connected to said engine so that the number of revolutions transmitted from said input shaft to said output shaft is varied in accordance with the number of revolutions of said alternator, whereby said alternator is operated at a constant speed by said rotation transmitting means.

11. An apparatus according to claim 1, wherein said excitation control circuit includes:
   a revolution detector for detecting the number of revolutions of said output shaft and generating an output signal corresponding to said number of revolutions;
   a comparison circuit connected to said revolution detector for comparing said detector output signal with a preset value; and
   an excitation current control circuit connected to said comparison circuit for controlling said excitation current in accordance with the output of said comparison circuit and causing said number of revolutions of said output shaft to approach said preset value.

12. An apparatus according to claim 11, wherein said excitation current control circuit includes a switching circuit for switching said excitation current on and off in accordance with the outputs of said comparison circuit.

13. An apparatus according to claim 7, wherein said engine includes power take off means for taking off the turning driving force of said engine for purposes other than running the vehicle, said power take off means being connected to said input shaft of said magnetic slip coupling.

* * * * *